United States Patent
Kobayashi et al.

(10) Patent No.: US 7,042,709 B2
(45) Date of Patent: May 9, 2006

(54) SOLID ELECTROLYTIC CAPACITOR AND SOLID ELECTROLYTIC CAPACITOR DEVICE

(75) Inventors: Masaaki Kobayashi, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/978,409

(22) Filed: Nov. 2, 2004

(65) Prior Publication Data
US 2005/0117279 A1    Jun. 2, 2005

(30) Foreign Application Priority Data
Nov. 7, 2003   (JP) .................... P2003-378823

(51) Int. Cl.
*H01G 9/00*    (2006.01)

(52) U.S. Cl. .............. 361/523; 361/525; 361/528; 361/529; 361/508; 29/25.03

(58) Field of Classification Search ........... 361/523, 361/524, 525, 504, 516, 519, 508–512, 528–534; 29/25.03
See application file for complete search history.

(56) References Cited

U.S. PATENT DOCUMENTS

| | | | |
|---|---|---|---|
| 4,831,494 A | 5/1989 | Arnold et al. | |
| 5,377,073 A * | 12/1994 | Fukaumi et al. | 361/523 |
| 5,880,925 A | 3/1999 | DuPré et al. | |
| 6,262,877 B1 | 7/2001 | Mosley | |
| 6,466,430 B1 | 10/2002 | Mido et al. | |
| 6,606,237 B1 | 8/2003 | Naito et al. | |
| 6,721,171 B1 * | 4/2004 | Masuda et al. | 361/523 |
| 6,751,833 B1 * | 6/2004 | Saito et al. | 361/523 |
| 6,775,125 B1 * | 8/2004 | Kimura et al. | 361/523 |
| 6,775,126 B1 * | 8/2004 | Fujii et al. | 361/523 |

FOREIGN PATENT DOCUMENTS

| | | |
|---|---|---|
| JP | A 2002-237431 | 8/2002 |
| JP | A 2002-353073 | 12/2002 |
| JP | A 2003-031438 | 1/2003 |
| WO | WO 01/91145 A1 | 11/2001 |

* cited by examiner

*Primary Examiner*—Nguyen T. Ha
(74) *Attorney, Agent, or Firm*—Oliff & Berridge, PLC

(57) ABSTRACT

A solid electrolytic capacitor includes a valve metal support, a dielectric layer, a solid polymer electrolyte layer, and an insulating layer. The valve metal support has an opening formed about an anode terminal forming area except for a part of surroundings thereof. The dielectric layer is formed on a surface of the valve metal support so as to expose a part of the anode forming area. The solid polymer electrolyte layer is formed on the dielectric layer. The solid electrolytic capacitor is provided with the insulating layer for electrically insulating the anode terminal forming area in the valve metal support and the solid polymer electrolyte layer from each other.

11 Claims, 12 Drawing Sheets

SOLID ELECTROLYTIC CAPACITOR AND SOLID ELECTROLYTIC CAPACITOR DEVICE

BACKGROUND OF THE INVENTION

1. Field of the Invention

The present invention relates to a solid electrolytic capacitor and a solid electrolytic capacitor device.

2. Related Background Art

Figure 12:
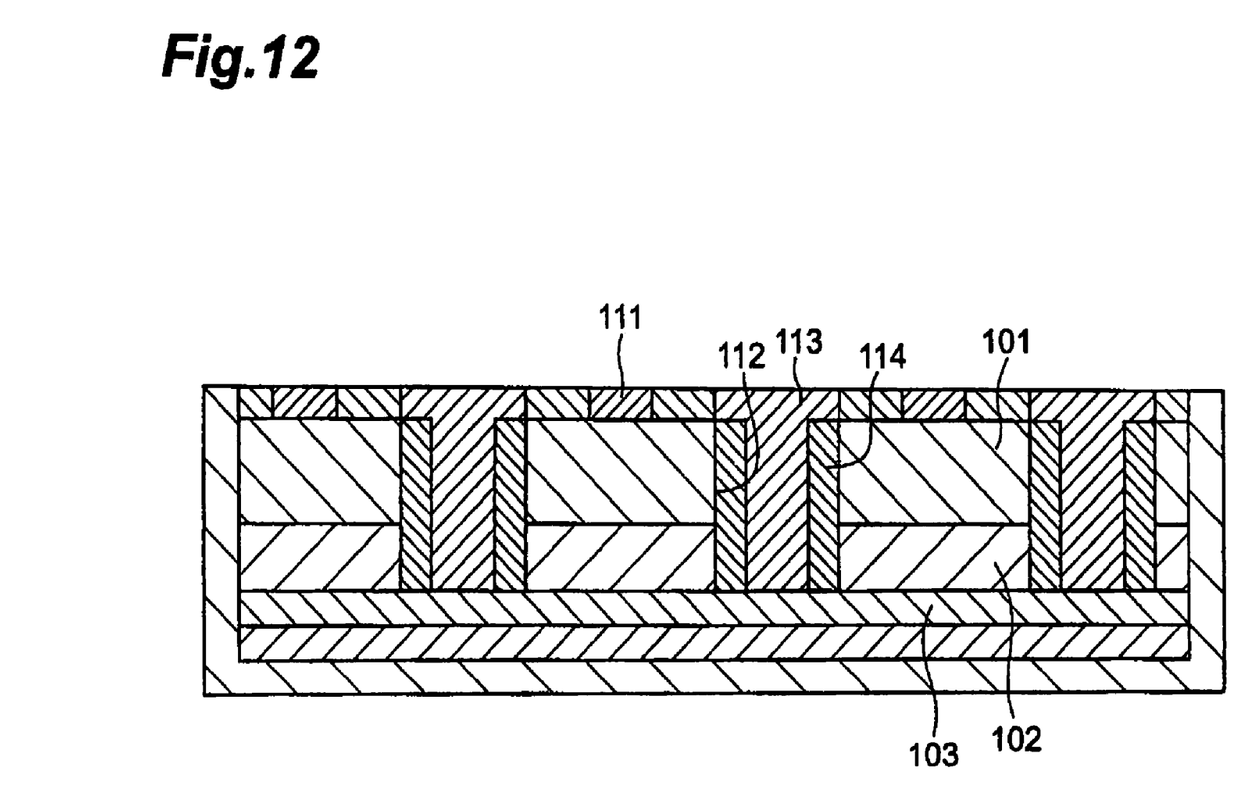
FIG. 12 is a sectional view showing a conventional solid electrolytic capacitor.

Known as a conventional solid electrolytic capacitor is one shown in FIG. 12. In this solid electrolytic capacitor, a dielectric film 102 and a solid electrolyte layer 103 to become a cathode are laminated on one surface of an aluminum foil 101 to become an anode. Connection terminals 111 are connected to the other surface of aluminum foil 101. Through holes 112 are formed in the aluminum foil 101 and dielectric film 102, whereas through hole electrodes 113 filling the through holes 112 are connected to the solid electrolyte layer 103. The inner wall of each through hole 112 is formed with an insulating film 114 for electrically insulating the aluminum foil 101 and the through hole electrode 113 from each other (see, for example, Japanese Patent Application Laid-Open No. 2003-31438).

SUMMARY OF THE INVENTION

The solid electrolytic capacitor of FIG. 12 can establish electrical connections with the aluminum foil 101 and solid electrolyte layer 103 from the same surface side of the solid electrolytic capacitor by way of the connection terminals 111 and through hole electrodes 113. If electrical connections with an anode and a cathode are established from the same surface side of the solid electrolytic capacitor as such, the wiring length can be shortened when the solid electrolytic capacitor is mounted to a circuit board or the like, whereby equivalent series resistance (ESR) and equivalent series inductance (ESL) can be lowered.

For making the solid electrolytic capacitor of FIG. 12, however, not only the step of forming the aluminum foil with the dielectric film 102 and solid electrolyte layer 103, but also at least three steps, i.e., the step of forming the through holes 112, the step of forming the inner wall of each through hole 112 with the insulating film 114, and the step of filling the through hole 112 with the through hole electrode 113, are necessary. Therefore, the solid electrolytic capacitor of FIG. 12 is problematic in that the making thereof becomes complicated.

In view of the above-mentioned problem, it is an object of the present invention to provide a solid electrolytic capacitor which can establish electrical connections with the anode and cathode from the same surface side and can be made easily, and a solid electrolytic capacitor device comprising the solid electrolytic capacitor.

For solving the above-mentioned problem, the solid electrolytic capacitor in accordance with the present invention comprises a valve metal support having an opening formed about a predetermined area except for a part of surroundings thereof; a dielectric layer formed on a surface of the valve metal support so as to expose a part of the predetermined area; a solid electrolyte layer formed on the dielectric layer; and an insulating layer for electrically insulating the predetermined area in the valve metal support and the solid electrolyte layer from each other.

In this solid electrolytic capacitor, a part of the predetermined area in the valve metal support is exposed so as to function as an anode. The opening and insulating layer electrically insulate the predetermined area from the solid electrolyte layer. The solid electrolyte layer is formed on the dielectric layer of the valve metal support except for the predetermined area. This can establish electrical connections with an anode (a part of the predetermined area in the valve metal support) and a cathode (solid electrolyte layer) from the same surface side of the solid electrolytic capacitor. Hence, a solid electrolytic capacitor in which both ESR and ESL are low is realized.

Also, this solid electrolytic capacitor requires no through holes for establishing electrical connections with the anode and cathode from the same surface side. Therefore, the process of making this solid electrolytic capacitor can omit any of the step of forming through holes, the step of forming the inner wall of each through hole with an insulating film, and the step of filling the through hole with a through hole electrode. Hence, the solid electrolytic capacitor in accordance with the present invention can be made easily.

Preferably, the solid electrolyte layers are formed on both surface sides of the valve metal support. In this case, both sides of the valve metal support contribute to accumulating electricity. As a consequence, the solid electrolytic capacitor attains substantially twice the electrostatic capacity of the case where the solid electrolyte layer is formed on only one surface of the valve metal support. Therefore, a solid electrolytic capacitor having a large electrostatic capacity is realized.

Preferably, the solid electrolytic capacitor comprises a plurality of the valve metal supports, the plurality of valve metal supports being laminated while the respective predetermined areas thereof are positioned with respect to each other. This can increase the electrostatic capacity of the whole solid electrolytic capacitor in proportion to the number of valve metal supports laminated.

Preferably, the predetermined area in the valve metal support has a bent form. In this case, using the predetermined area as a positioning mark in the valve metal support makes it easier to position the solid electrolytic capacitor with respect to a circuit board or the like. Also, when laminating a plurality of valve metal supports, the positioning of valve metal supports becomes easier. For example, such a predetermined area is formed by being bent so as to project from the remaining area of the valve metal support.

The solid electrolytic capacitor device in accordance with the present invention comprises a solid electrolytic capacitor comprising a valve metal support having an opening formed about a predetermined area except for a part of surroundings thereof, a dielectric layer formed on a surface of the valve metal support so as to expose a part of the predetermined area, a solid electrolyte layer formed on the dielectric layer, and an insulating layer for electrically insulating the predetermined area in the valve metal support and the solid electrolyte layer from each other; and a substrate including an anode part electrically connected to the predetermined area in the valve metal support, and a cathode part electrically connected to the solid electrolyte layer.

In this solid electrolytic capacitor, a part of the predetermined area in the valve metal support is exposed so as to function as an anode. The opening and insulating layer electrically insulate the predetermined area from the solid electrolyte layer. The solid electrolyte layer is formed on the dielectric layer of the valve metal support except for the predetermined area. This can establish electrical connections with the anode and cathode from the same surface side of the solid electrolytic capacitor. Therefore, any of the connection between the predetermined area of the solid electrolytic capacitor and the anode part of the substrate, and the connection between the solid electrolyte layer of the solid electrolytic capacitor and the cathode part of the substrate can be established with a short wiring length. Hence, a solid electrolytic capacitor device in which both ESR and ESL are low is realized.

Also, no through holes are required to be formed in the solid electrolytic capacitor for establishing electrical connections with the anode and cathode from the same surface side. Therefore, the process of making this solid electrolytic capacitor can omit any of the step of forming through holes, the step of forming the inner wall of each through hole with an insulating film, and the step of filling the through hole with a through hole electrode. Hence, the solid electrolytic capacitor can be made easily, whereby the solid electrolytic capacitor device can be made easily.

Preferably, the anode part and cathode part penetrate through the substrate. This can shorten current paths when supplying electric charges to the solid electrolytic capacitor from the outside and taking out electric charges from the solid electrolytic capacitor to the outside. As a consequence, the ESR and ESL of the solid electrolytic capacitor device are further lowered.

Preferably, a plurality of the predetermined areas are provided in the valve metal support, the substrate is provided with a plurality of the anode parts corresponding to the respective predetermined areas, and the cathode part is disposed between anode parts placed close to each other in the plurality of anode parts. In this case, a current flowing through an anode part and a current flowing through the cathode part disposed between anode parts are directed opposite from each other, whereby the magnetic field caused by the current flowing through one of the anode and cathode parts cancels out the magnetic field caused by the current flowing through the other. As a consequence, the ESL of the solid electrolytic capacitor device is further lowered.

The present invention realizes a solid electrolytic capacitor which can establish electrical connections with the anode and cathode from the same surface side and can be made easily, and a solid electrolytic capacitor device comprising the solid electrolytic capacitor.

DESCRIPTION OF THE PREFERRED EMBODIMENTS

In the following, preferred embodiments of the solid electrolytic capacitor and solid electrolytic capacitor device in accordance with the present invention will be explained in detail with reference to the drawings. In the explanation of the drawings, constituents identical to each other will be referred to with numerals identical to each other without repeating their overlapping descriptions. Ratios of dimensions in the drawing do not always match those explained.

Figure 1:
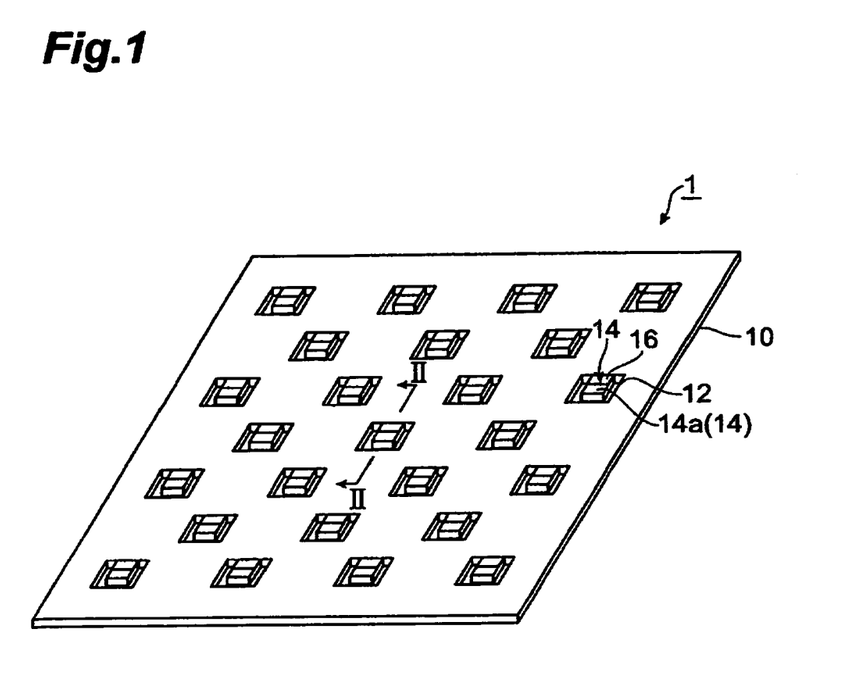
FIG. 1 is a perspective view showing an embodiment of the solid electrolytic capacitor in accordance with the present invention.
Figure 2:
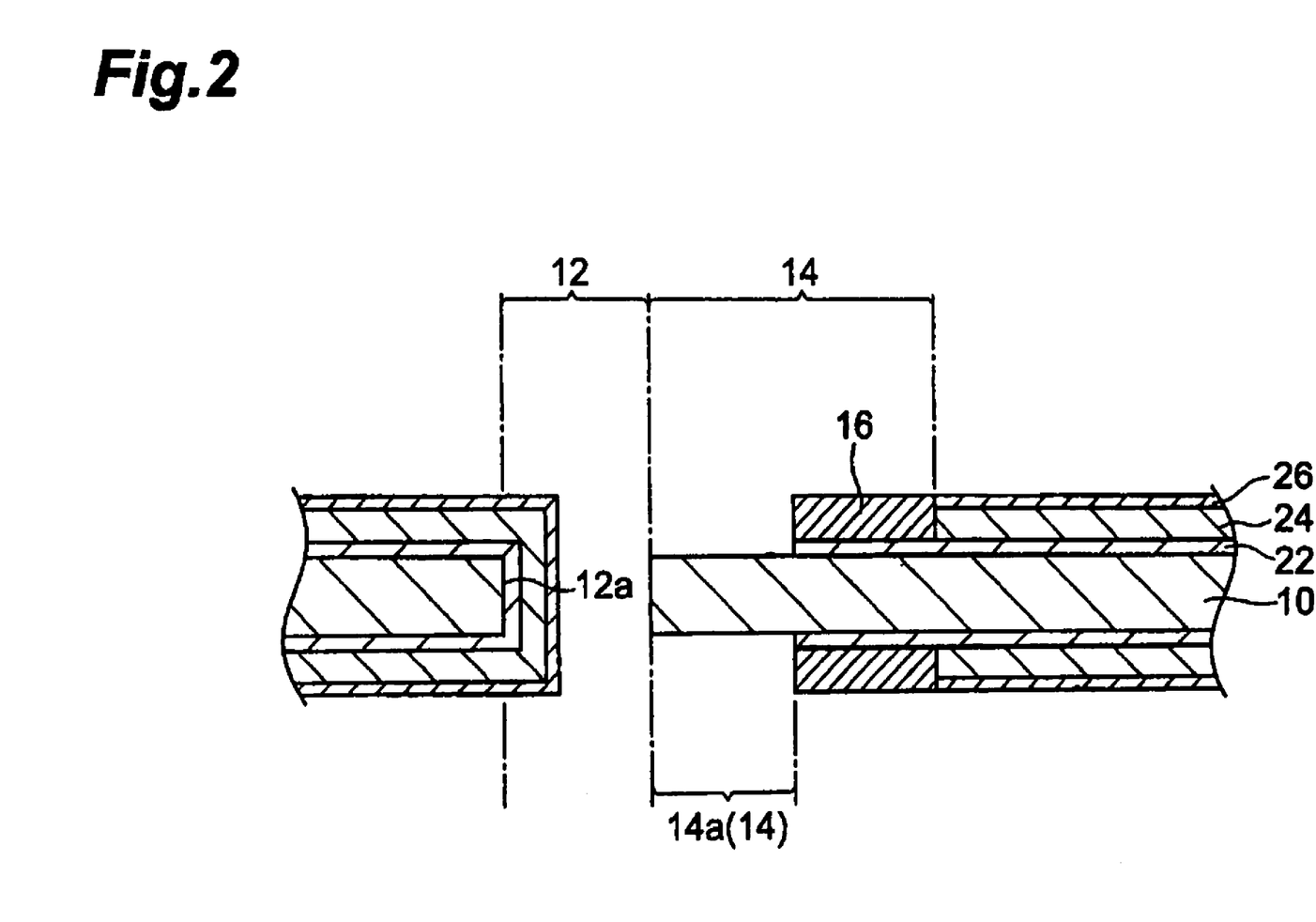
FIG. 2 is an end face view showing the solid electrolytic capacitor 1 of FIG. 1 taken along the line II—II thereof.

FIG. 1 is a perspective view showing an embodiment of the solid electrolytic capacitor in accordance with the present invention. FIG. 2 is an end face view showing the solid electrolytic capacitor 1 of FIG. 1 taken along the line II—II thereof. The solid electrolytic capacitor 1 comprises a valve metal support 10, a dielectric layer 22, a solid polymer electrolyte layer 24, and an insulating layer 16. The valve metal support 10 is made of a metal (valve metal) capable of forming an insulating oxide film and is formed like a flat sheet. Examples of such a valve metal include aluminum, titanium, and tantalum. The valve metal support 10 functions as an anode in the solid electrolytic capacitor 1.

The valve metal support 10 is formed with a plurality of openings 12. These openings 12 are arranged at equally spaced intervals in an oblique lattice on the valve metal support 10. Each opening 12 is formed about a quadrangular anode terminal forming area provided on the valve metal support 10, while leaving a part of the surroundings thereof. Specifically, the opening 12 defines three sides of the surroundings of the anode terminal forming area. The remaining one side in the surroundings of the anode terminal forming area is left by the opening, so as to form a boundary between the anode terminal forming area and the remaining area. Here, the remaining area refers to the part of the valve metal support 10 excluding the anode terminal forming area.

Each anode terminal forming area in the valve metal support 10 is surrounded by its corresponding opening 12, so as to produce a projection 14. The projection 14 is formed on the valve metal support 10, so as to protrude into the opening 12. The base end part of the projection 14, i.e., an end part adjacent to the part of surroundings of the projection 14 left by the opening 12, is connected to the remaining area in the valve metal support 10. The above-mentioned solid polymer electrolyte layer 24 is not formed on the projection 14.

The base end part of the projection 14 is formed with the insulating layer 16. The insulating layer 16 electrically insulates the valve metal support 10 constituting the projection 14 and the solid polymer electrolyte layer from each other. On the other hand, the leading end part of the projection 14 is not formed with the insulating layer 16, whereby the valve metal support 10 is exposed. The part of the projection 14 at which the valve metal support 10 is exposed is an anode terminal part 14a. The anode terminal part 14a is completely surrounded by the opening 12 and the insulating layer 16, and is electrically insulated from the solid polymer electrolyte layer 24 by the opening 12 and the insulating layer 16. The surface of the anode terminal part 14a may be either roughened as will be explained later, or left as it is. Functions of the solid electrolytic capacitor 1 are not affected in either case.

The surface of the valve metal support 10 is roughened (expanded), whereas the dielectric layer 22 (insulating oxide film) is formed on the roughened surface by anode oxidization (see FIG. 2). The solid polymer electrolyte layer 24 is formed on the dielectric layer 22. The solid polymer electrolyte layer 24 functions as a cathode in the solid electrolytic capacitor 1. A conductive layer 26 made of a carbon paste or silver paste, for example, is formed on the solid polymer electrolyte layer 24. An electrical connection with the solid polymer electrolyte layer 24 is established by way of the conductive layer 26.

The dielectric layer 22, solid polymer electrolyte layer 24, and conductive layer 26 are formed on not only one face but both faces of the valve metal support 10, and on the inner wall 12a of the opening 12 as well. However, the surface of the projection 14 is formed with neither the solid polymer electrolyte layer 24 nor the conductive layer 26. In particular, the surface of the anode terminal part 14a is formed with none of the dielectric layer 22, solid polymer electrolyte layer 24, and conductive layer 26.

Effects of the solid electrolytic capacitor 1 will now be explained. In the solid electrolytic capacitor 1, the valve metal support 10 is exposed at the leading end part of the projection 14. The exposed valve metal support 10 is electrically insulated from the solid polymer electrolyte layer 24 by the opening 12 and insulating layer 16. As a consequence, an electrical connection with the valve metal support 10 exposed at the leading end part of the projection 14 can be established from the surface on the side formed with the solid polymer electrolyte layer 24 in the solid electrolytic capacitor 1. Namely, electrical connections with the anode (exposed part of the valve metal support 10) and the cathode (solid polymer electrolyte layer 24) can be established from the same surface side of the solid electrolytic capacitor 1. This realizes a solid electrolytic capacitor 1 in which both ESR and ESL are low. Also, since the anode and cathode can be disposed close to each other and arranged alternately, further lower ESR and lower ESL are realized.

Further, no through hole electrodes are required to be formed in order to establish electrical connections with the anode and cathode from the same surface side in the solid electrolytic capacitor 1, so that any of the step of forming through holes, the step of forming the inner wall of each through hole with an insulating film, and the step of filling the through hole with a through hole electrode can be omitted. Hence, the solid electrolytic capacitor 1 can be made easily.

In a configuration requiring through hole electrodes such as the solid electrolytic capacitor shown in FIG. 12, complicated resist processing is needed in the manufacturing process. In this case, the resist may remain in the finely roughened structure of the valve metal support surface, whereby the capacity occurrence rate of the solid electrolytic capacitor may become unstable. For eliminating this problem, a careful washing step is needed, which complicates the solid electrolytic capacitor manufacturing process. By contrast, no through hole electrodes are required to be formed in the solid electrolytic capacitor 1, whereby the resist processing is simplified. Therefore, while no careful washing step is required, the problem of the capacity occurrence rate becoming unstable can be eliminated in the making of the solid electrolytic capacitor 1.

Since the solid polymer electrolyte layers 24 are formed on both surface sides of the valve metal support 10, both sides of the valve metal support 10 contribute to accumulating electricity. As a consequence, the solid electrolytic capacitor 1 yields substantially twice the electrostatic capacity of the case where the solid polymer electrolyte layer 24 is formed on only one surface of the valve metal support 10. This realizes the solid electrolytic capacitor 1 having a large electrostatic capacity in particular.

Also, since the openings 12 are formed, current paths on the cathodes can be shortened. As a consequence, electrical connections with the solid polymer electrolyte layers 24 formed on both sides of the valve metal support 10 can be established from either side of the valve metal support 10. When the valve metal support 10 is formed with no openings 12, current paths travel end parts of the valve metal support 10, and thus are elongated, whereby ESR and ESL increase. In the solid electrolytic capacitor 1, by contrast, electrons can migrate between both sides of the valve metal support 10 by way of the openings 12, so as to shorten current paths, thereby lowering both ESR and ESL.

Figure 3:
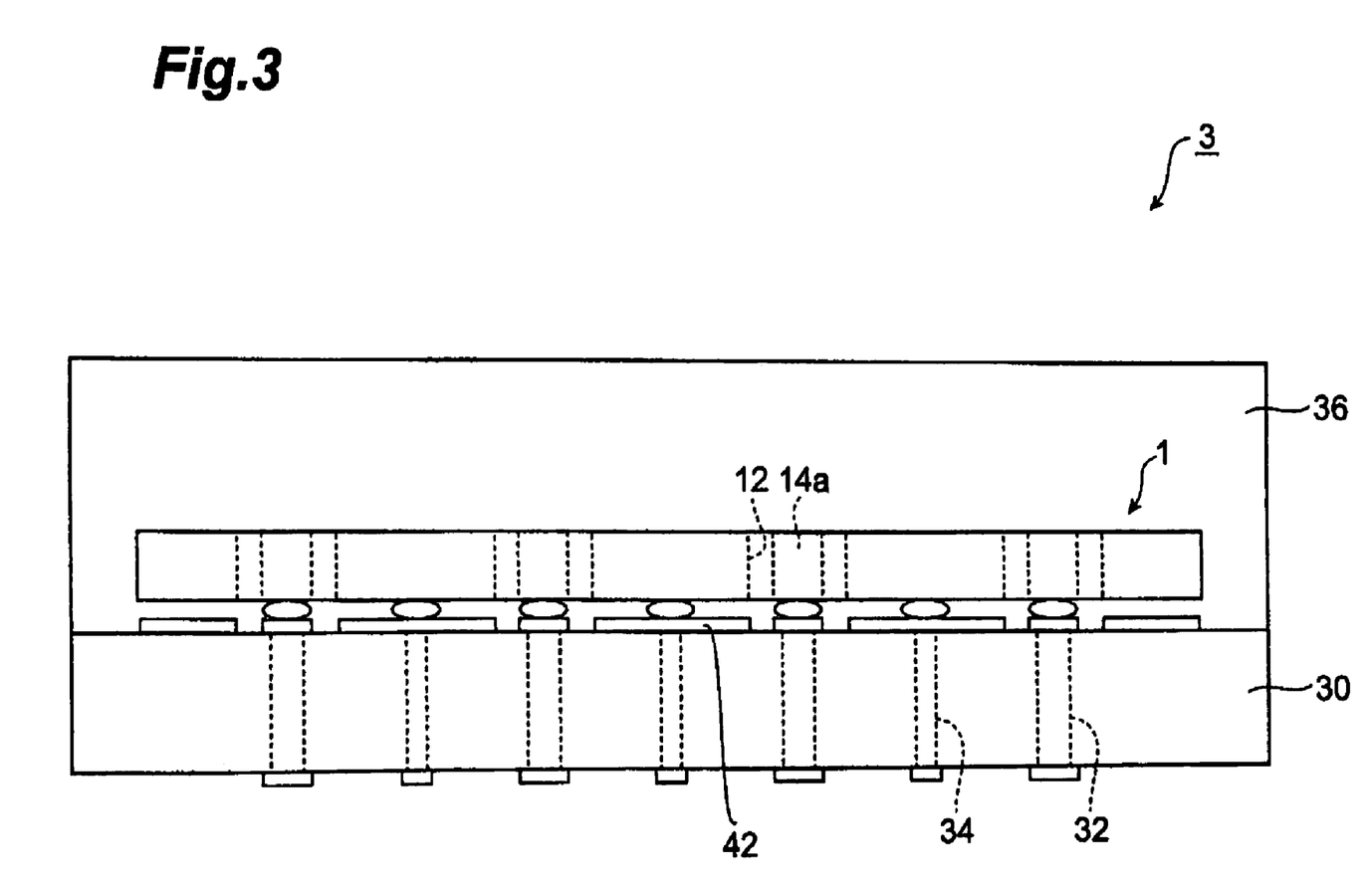
FIG. 3 is a side view showing an embodiment of the solid electrolytic capacitor device in accordance with the present invention.

FIG. 3 is a side view showing an embodiment of the solid electrolytic capacitor device in accordance with the present invention. This solid electrolytic capacitor device 3 comprises the solid electrolytic capacitor 1, a substrate 30, and a resin mold 36. The substrate 30 includes anode parts 32 and cathode parts 34, and mounts the solid electrolytic capacitor 1 thereon. The anode parts 32 are electrically connected to their corresponding anode terminal parts 14a in the solid electrolytic capacitor 1. On the other hand, the cathode parts 34 are electrically connected to the solid polymer electrolyte layer 24 in the solid electrolytic capacitor 1 by way of the conductive layer 26. The anode parts 32 and cathode parts 34 penetrate through the substrate 30, so that their one ends are electrically connected to their corresponding anode terminal parts 14a, and solid polymer electrolyte layer 24, whereas the other ends are exposed at the surface of the substrate 30 opposite from the solid electrolytic capacitor 1.

The resin mold 36 is formed on the substrate 30 on which the solid electrolytic capacitor 1 is mounted. The resin mold 36 covers the solid electrolytic capacitor 1 as a whole, so as to protect the solid electrolytic capacitor 1 and improve the mechanical strength of the whole solid electrolytic capacitor device 3.

Figure 4:
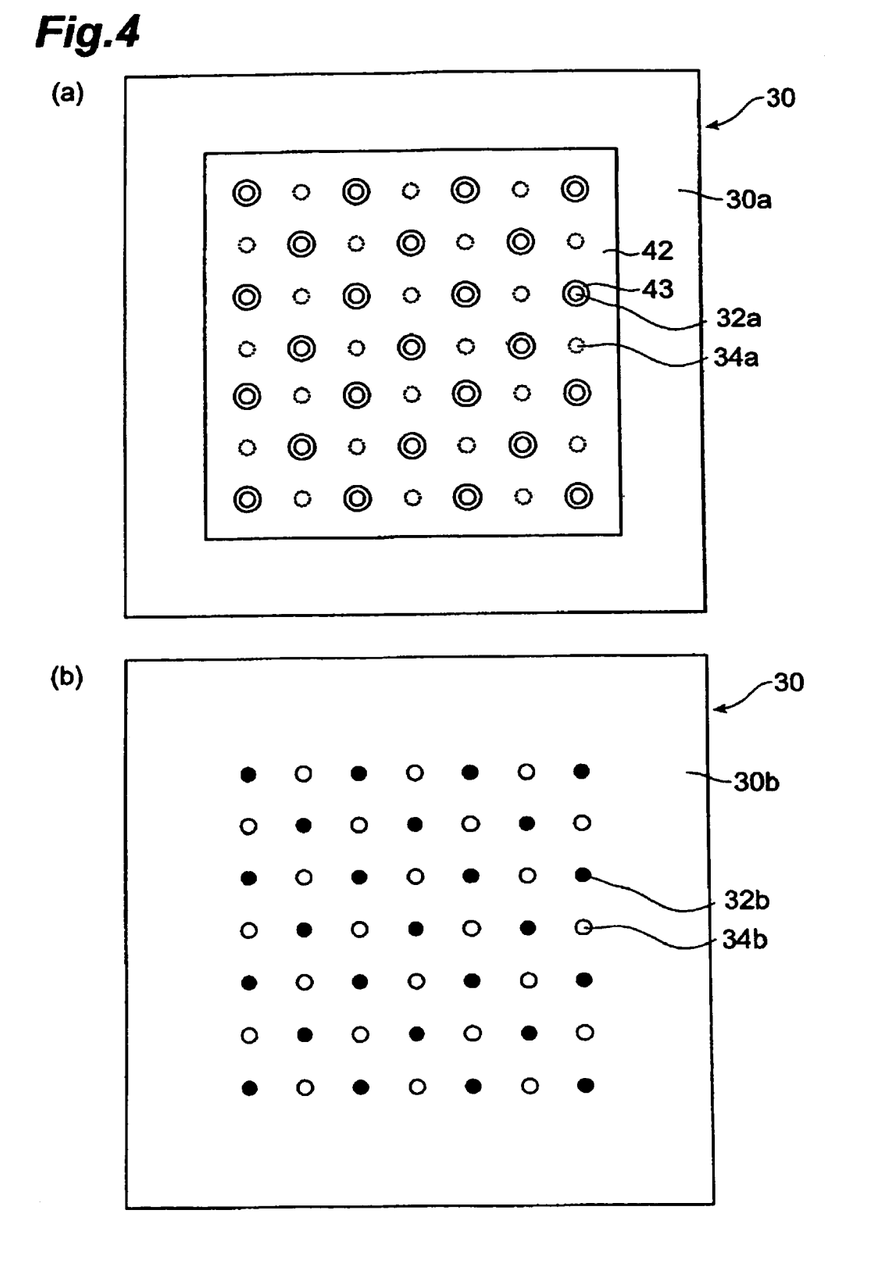
FIG. 4 is a plan view showing the front face 30a and rear face 30b of the substrate 30 in FIG. 3.

The configuration of the substrate 30 will now be explained in more detail with reference to FIG. 4. FIG. 4 is a plan view showing the front face 30a and rear face 30b of the substrate 30. Specifically, in FIG. 4, (a) is a plan view showing the front face 30a of the substrate 30, whereas (b) is a plan view showing the rear face 30b of the substrate 30. Here, the front face 30a is a surface on which the solid electrolytic capacitor 1 is mounted, whereas the rear face 30b is a surface by which the substrate 30 is mounted on a printed board or the like. As shown in (a) of FIG. 4, the area on the surface 30a excluding fringes thereof is covered with a copper foil 42. The area formed with the copper foil 42 is provided with anode land electrodes 32a partly forming the anode parts 32 and cathode land electrodes 34a partly forming the cathode parts 34. Within this area, the anode land electrodes 32a are arranged in an oblique lattice, whereas their arrangement pattern and arrangement pitch correspond to the anode terminal parts 14a in the solid electrolytic capacitor 1. Ring-shaped regions 43 surrounding the respective anode land electrodes 32a are areas free of the copper foil. Namely, the copper foil 42 is not formed in these areas 43, whereby the anode land electrodes 32a and cathode land electrodes 34a are prevented from being conducted to each other by way of the copper foil 42. Each cathode land electrode 34a is disposed between two anode land electrodes 32a placed close to each other. In this embodiment, in particular, each cathode land electrode 34a is placed at a position corresponding to the midpoint of the segment connecting two anode land electrodes 32a disposed close to each other. On the other hand, as shown in (b) of FIG. 4, anode land electrodes 32b and cathode land electrodes 34b are formed on the rear face 30b at respective positions corresponding to the anode land electrodes 32a and cathode land electrodes 34a on the front face 30a. For distinguishing the electrodes 32b and 34b from each other, the anode land electrodes 32b are schematically blackened in (b) of FIG. 4. In an example of dimensions of the substrate 30, the whole substrate 30 (front face 30a or rear face 30b) is 20 mm×20 mm, the area formed with the copper foil 42 is 15 mm×15 mm, the diameter of each of the anode land electrodes 32a and cathode land electrodes 34a is 0.5 mm, and the diameter of each region 43 is 1.0 mm.

Effects of the solid electrolytic capacitor device 3 will now be explained. The solid electrolytic capacitor device 3 comprises the solid electrolytic capacitor 1 which can establish electrical connections with the anode and cathode from the same surface side. Therefore, the connection between the solid electrolytic capacitor 1 and substrate 30 can be established with a short wiring length. Hence, the solid electrolytic capacitor device 3 in which both ESR and ESL are low is realized. The solid electrolytic capacitor 1 can be made easily since it requires no through hole electrodes, whereby the solid electrolytic capacitor device 3 can also be made easily.

The anode parts 32 and cathode parts 34 penetrate through the substrate 30. This can shorten current paths when supplying electric charges to the solid electrolytic capacitor 1 from the outside and taking out electric charges from the solid electrolytic capacitor 1 to the outside. This further lowers the ESR and ESL of the solid electrolytic capacitor device 3.

A plurality of anode parts 32 are connected to the respective anode terminal parts 14a, whereas each cathode part 34 is disposed between two anode parts 32 placed close to each other in the plurality of anode parts 32. In this case, a current flowing through the anode part 32 and a current flowing through the cathode part 34 disposed between anode parts 32 are directed opposite from each other, whereby the magnetic field caused by the current flowing through one of the anode part 32 and cathode part 34 cancels out the magnetic field caused by the current flowing through the other. As a consequence, the ESL of the solid electrolytic capacitor device 3 is further lowered.

Figure 5:
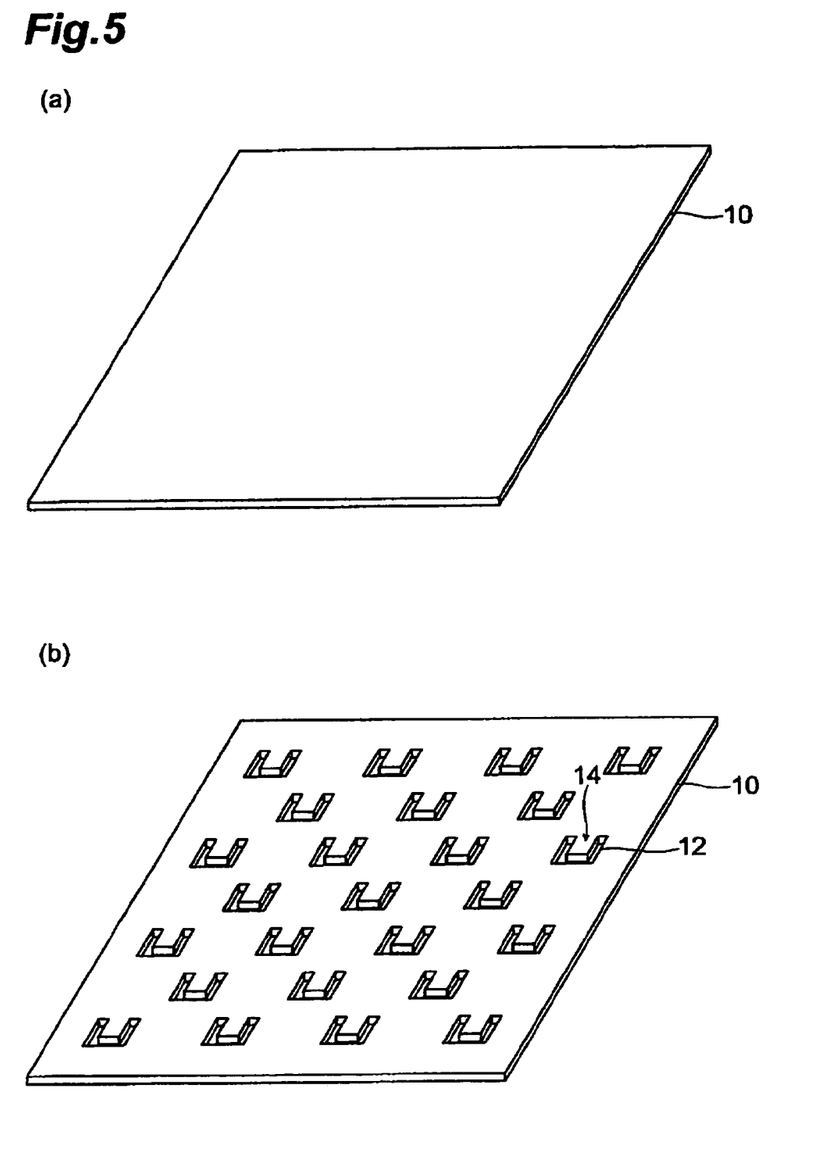
FIG. 5 is a process drawing showing an example of method of making the solid electrolytic capacitor in FIG. 1 and the solid electrolytic capacitor device 3 in FIG. 3.
Figure 6:
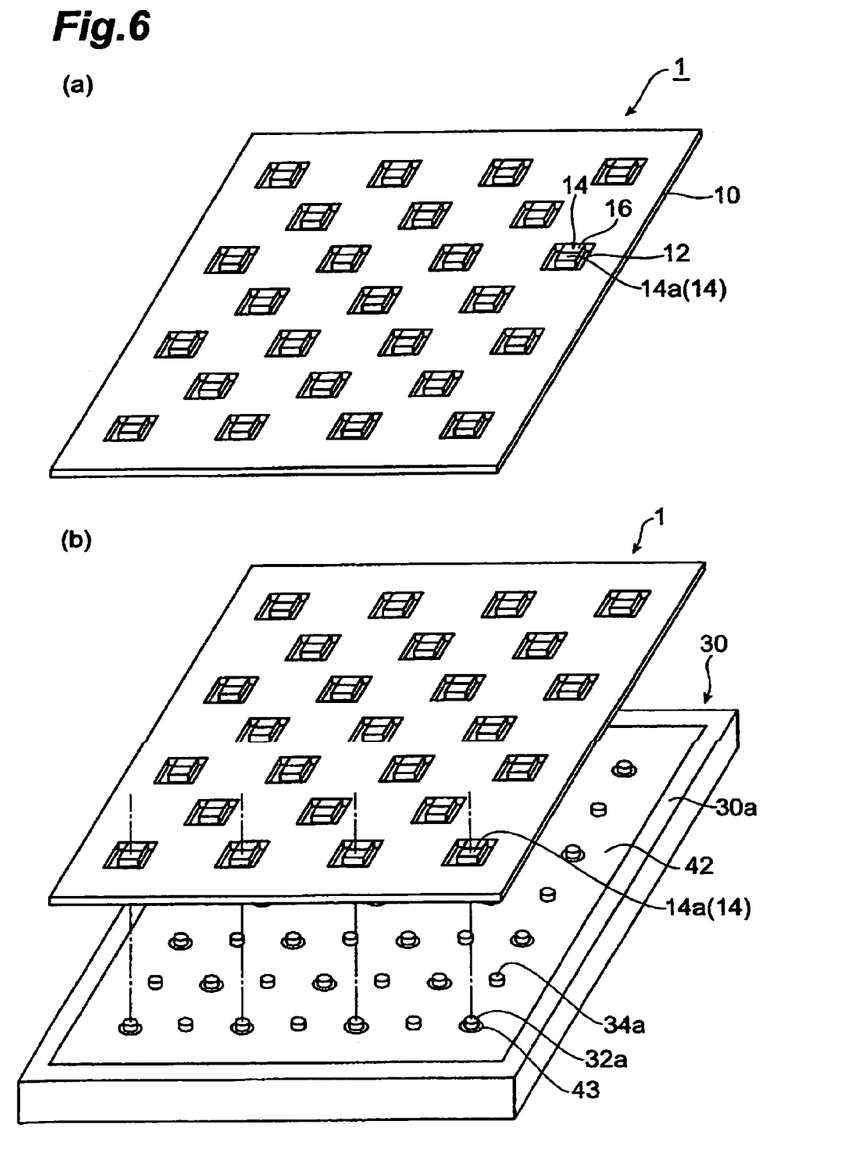
FIG. 6 is a process drawing showing the example of method of making the solid electrolytic capacitor in FIG. 1 and the solid electrolytic capacitor device 3 in FIG. 3.
Figure 7:
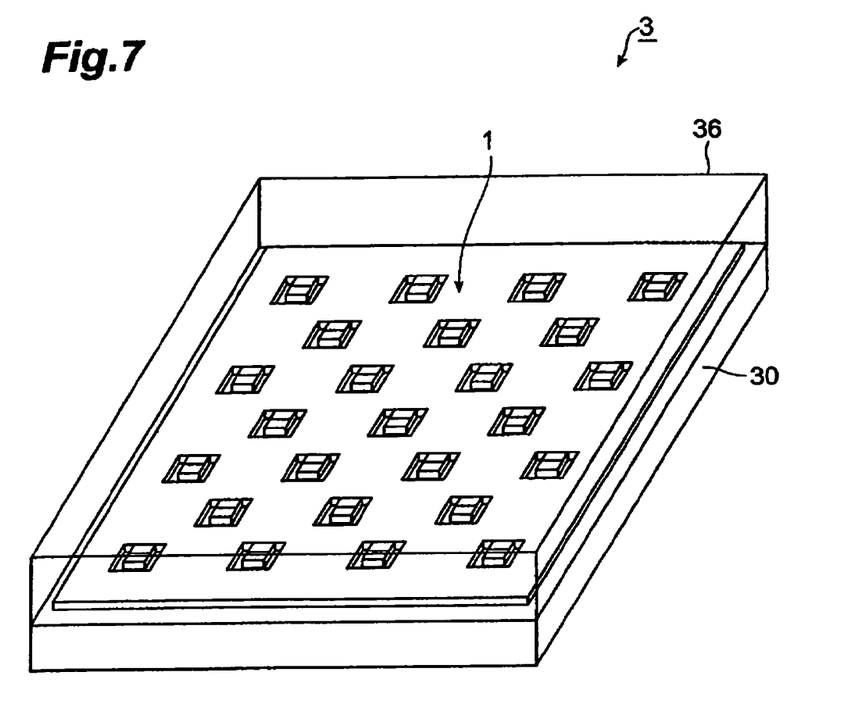
FIG. 7 is a process drawing showing the example of method of making the solid electrolytic capacitor in FIG. 1 and the solid electrolytic capacitor device 3 in FIG. 3.

With reference to FIGS. 5 to 7, an example of method of making the solid electrolytic capacitor 1 in FIG. 1 and the solid electrolytic capacitor device 3 in FIG. 3 will be explained. FIG. 5 is a process drawing showing an example of method of making the solid electrolytic capacitor 1 in FIG. 1 and the solid electrolytic capacitor device 3 in FIG. 3. Specifically, (a) and (b) in FIG. 5 show respective steps of the example of method of making the solid electrolytic capacitor in FIG. 1 and the solid electrolytic capacitor device 3 in FIG. 3. In FIG. 6, (a) and (b) show respective steps of the example of method of making the solid electrolytic capacitor in FIG. 1 and the solid electrolytic capacitor device 3 in FIG. 3.

First, an aluminum foil is prepared as the valve metal support 10. Here, a surface of the aluminum foil is roughened and anode-oxidized, so as to form a dielectric layer 22 made of $Al_2O_3$ ((a) in FIG. 5). Subsequently, openings 12 are formed at predetermined positions in the valve metal support 10. This forms projections 14. Also, the valve metal support 10 is anode-oxidized, so as to form a dielectric layer 22 on the inner wall of each opening 12 ((b) in FIG. 5).

Next, the roughened structure of the surface of the anode terminal part 14a in each projection 14 is collapsed by compression or the like. The base end part of the projection 14 is formed with an insulating layer 16 made of a resin, for example. Further, a solid polymer electrolyte layer 24 and a conductive layer 26 (both not depicted) are successively laminated on the remaining area of the valve metal support 10. Here, in order to prevent the solid polymer electrolyte layer 24 and conductive layer 26 from being formed on the projection 14, the lamination is carried out while a resist is formed on the projection 14. After forming the solid polymer electrolyte layer 24 and conductive layer 26, only the resist layer is peeled off, whereby the solid electrolytic capacitor 1 is obtained ((a) in FIG. 6). Then, the solid electrolytic capacitor 1 is mounted on the front face 30a of a substrate 30 prepared separately. Here, the solid electrolytic capacitor 1 and the substrate 30 are positioned with respect to each other such that anode terminal parts 14a and their corresponding anode land electrodes 32a are in contact with each other. The anode terminal parts 14a and the anode land electrodes 32a are connected to each other by welding, for example. The conductive layer 26 and the cathode land electrodes 34a are connected to each other by a conductive adhesive, for example ((b) in FIG. 6).

Finally, a resin mold 36 is formed on the substrate 30 mounted with the solid electrolytic capacitor 1. Here, the whole solid electrolytic capacitor 1 is covered with the resin mold 36. This yields the solid electrolytic capacitor device 3 (FIG. 7).

Figure 8:
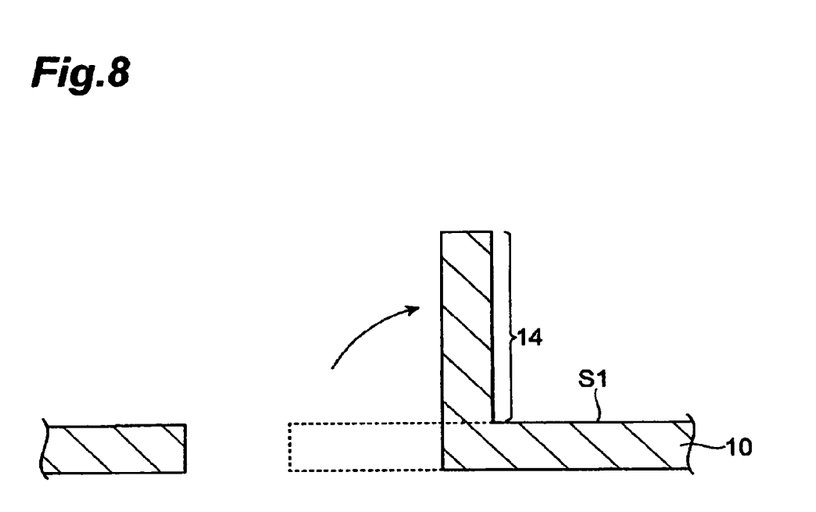
FIG. 8 is a view for explaining a modified example of the solid electrolytic capacitor 1 of FIG. 1.

FIG. 8 is a view for explaining a modified example of the solid electrolytic capacitor 1 of FIG. 1. This drawing shows the solid electrolytic capacitor in accordance with the modified example at the same end face as that of FIG. 2. This drawing illustrates only the valve metal support 10 without depicting the other constituents. In this modified example, as depicted, the valve metal support 10 is bent such that the projection 14 protrudes from the surface S1 of the remaining area in the valve metal support 10. In this modified example, using the projection 14 as a positioning mark makes it easier to position the solid electrolytic capacitor with respect to a circuit board or the like. Also, the anode terminal part 14a and its corresponding anode part 32 (not depicted in FIG. 8) of the substrate 30 can be brought into contact with each other reliably and easily.

Figure 9:
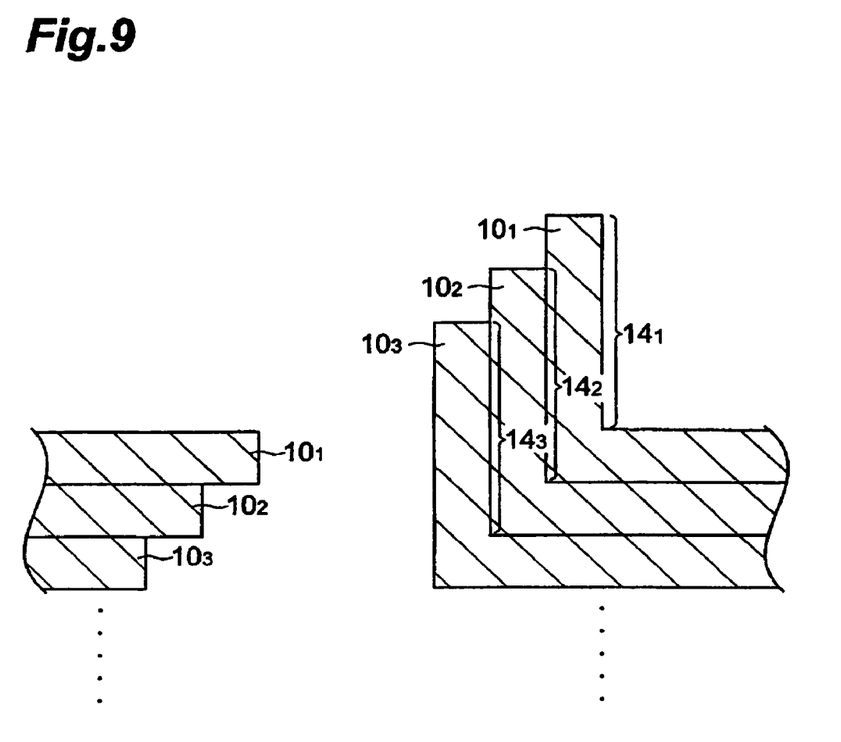
FIG. 9 is a view for explaining another modified example of the solid electrolytic capacitor 1 of FIG. 1.

FIG. 9 is a view for explaining another modified example of the solid electrolytic capacitor 1 of FIG. 1. This drawing shows the solid electrolytic 10 capacitor in accordance with the modified example at the same end face as that of FIG. 2 without illustrating the part other than the valve metal support. As depicted, the solid electrolytic capacitor in accordance with this modified example comprises a plurality of valve metal supports $10_1$, $10_2$, $10_3$. These valve metal supports $10_1$, $10_2$, $10_3$ are laminated in a state where their projections $14_1$, $14_2$, $14_3$ are positioned with respect to each other. This can increase the electrostatic capacity of the whole solid electrolytic capacitor in proportion to the number of valve metal supports laminated. Also, since the valve metal support in accordance with the modified example of FIG. 8 is used as a valve metal support, the positioning between the valve metal supports is made easier.

The present invention will now be explained with reference to more specific examples, which do not restrict the present invention.

EXAMPLE 1

A solid electrolytic capacitor and a solid electrolytic capacitor device were made in accordance with an embodiment.

(1) Making of Solid Electrolytic Capacitor

Figure 10:
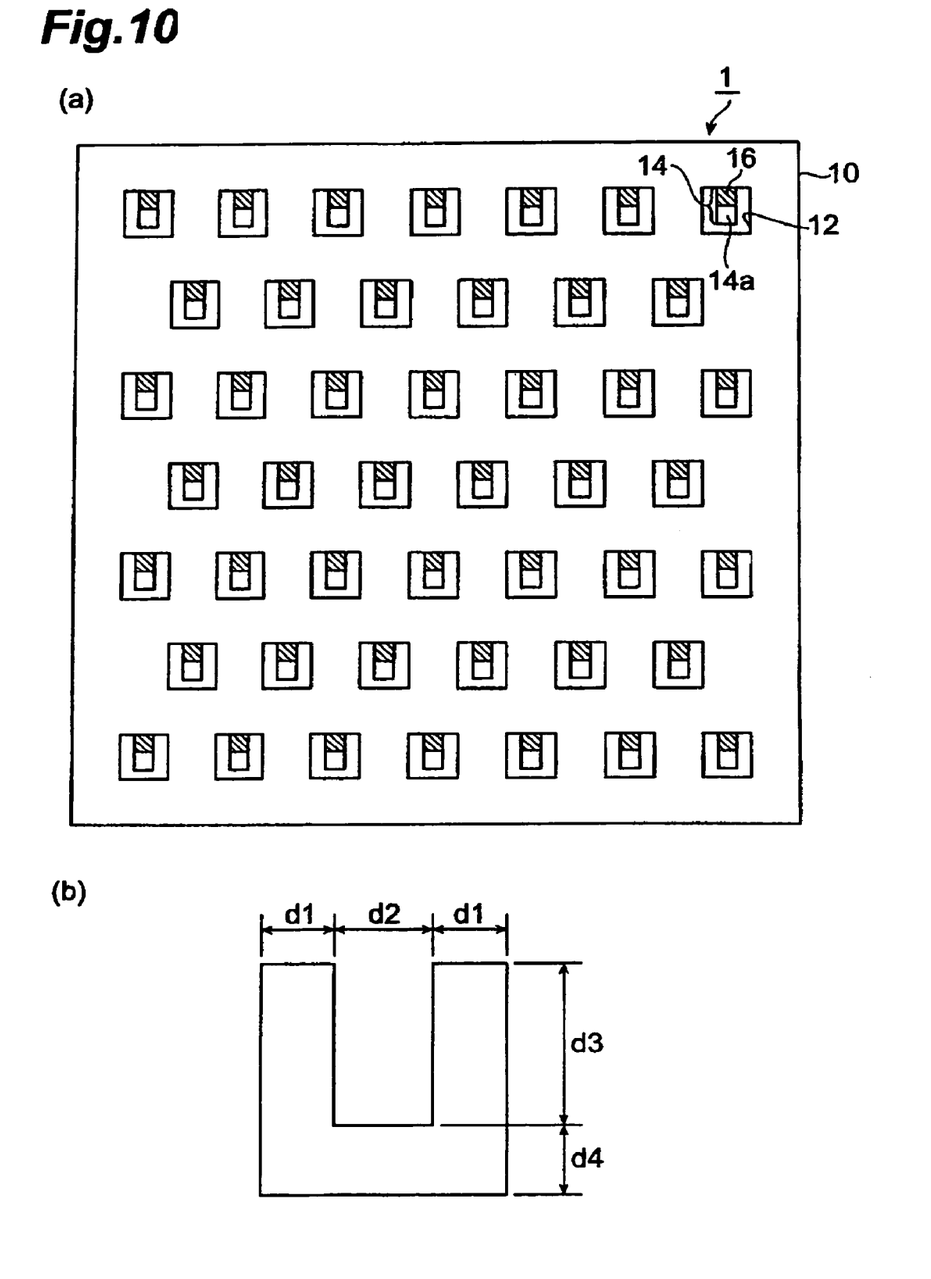
FIG. 10 is a view for explaining the solid electrolytic capacitor 1 in accordance with an example.

FIG. 10 is a view showing the solid electrolytic capacitor in accordance with this example, in which (a) is a plan view showing the solid electrolytic capacitor 1 produced in this example, whereas (b) in FIG. 10 is an enlarged view showing an opening 12 in (a) of FIG. 10.

First, from an aluminum foil sheet, which had been subjected to roughening and formed with an aluminum oxide film, yielding an electrostatic capacity of 150 µF/cm² at a thickness of 100 µm, an aluminum anode electrode body (valve metal support) 10 was made by punching so as to become a flat sheet of 15 mm×15 mm.

By punching or laser trimming, thus punched electrode body 10 was formed with 46 openings 12. With reference to (b) of FIG. 10, the size of each opening 12 was such that d1=d4=0.3 mm, d2=0.4 mm, and d3=0.7 mm.

In the electrode body 10, the roughened structure of each projection 14 defined by the opening 12 was collapsed by pressing.

In thus produced electrode body 10, only the base end part (an area of 0.4 mm×0.3 mm here) of the projection 14 was coated with a silicone resin (hatched in (a) of FIG. 10) as an insulating layer 16 by screen printing.

Thereafter, both surfaces of only the projections 14 were coated with a UV-curable resist.

Further, an electrode made of an aluminum foil was formed at one end part of thus obtained electrode body 10, so as to be used as an anode-side auxiliary electrode. Subsequently, the electrode body 10 was completely dipped in an aqueous ammonium adipate solution adjusted to a pH of 6.0 at a concentration of 7% by weight, and was set within the aqueous ammonium adipate solution so that a part of the auxiliary electrode protrudes from within the aqueous solution.

Next, using the auxiliary electrode as an anode, anode oxidization was performed about the cut end face of each opening 12 of the electrode body 10 dipped in the aqueous ammonium adipate solution under a condition with a current density of 50 to 100 mA/cm² and a voltage of 8 V, so as to form an aluminum oxide film.

Thereafter, the electrode body 10 was lifted from the aqueous ammonium adipate solution and then washed. Further, a solid polymer electrolyte layer made of polypyrrole was formed by chemical oxidative polymerization on the surface of the electrode body 10.

For generating the solid polymer electrolyte layer made of polypyrrole, an operation in which the whole electrode body 10 was dipped into an ethanol/water mixed solution cell containing 0.1 mol/liter of refined pyrrole monomer, 0.1 mol/liter of sodium alkylnaphthalenesulfonate, and 0.05 mol/liter of iron sulfate (III) and they were stirred for 10 minutes so as to advance chemical oxidative polymerization was repeated three times. As a result, a solid polymer electrolyte layer having a maximum surface thickness of about 1 µm was formed.

A carbon paste was applied to the surface of thus obtained solid polymer electrolyte layer, and a silver paste was applied to the surface of the carbon paste, so as to form a conductive layer. Thereafter, the resist layer applied to each projection 14 was dissolved by an organic solvent, so as to eliminate the resist, thereby exposing the anode terminal part 14a of the projection 14. The solid electrolytic capacitor 1 was produced by the foregoing processing.

The foregoing operation was repeated, so as to prepare 138 (46×3) solid electrolytic capacitors 1.

(2) Making of Substrate (Processing of Each Surface)

A substrate 30 (see FIG. 3) for mounting the solid electrolytic capacitor 1 was made.

Figure 11:
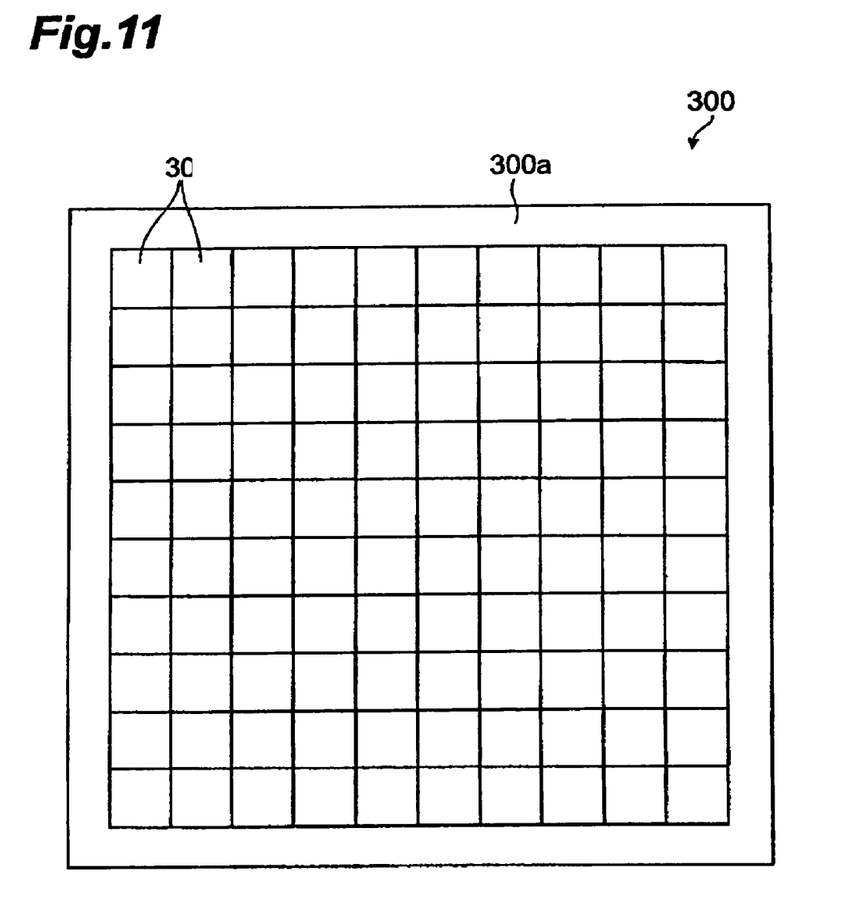
FIG. 11 is a view for explaining the substrate 30 in accordance with the example.

A glass-cloth-containing heat-resistant epoxy resin substrate (hereinafter referred to as FR4 substrate) 300 having a thickness of 0.3 mm with a copper foil thickness of 36 µm was processed into a size of 220 mm×220 mm. FIG. 11 is a plan view showing the FR4 substrate 300. On one surface 300a (the surface on the side to be mounted with the solid electrolytic capacitor) of the FR4 substrate 300, a resist layer was patterned so as to form a wiring pattern. (see (b) of FIG. 6) of a capacitor device (15 mm×15 mm) within an area of 20.0 mm×20.0 mm. On the surface 300a, 100 patterned 20.0 mm×20.0 mm areas were formed. On the other surface 300b (not depicted), a resist layer was formed and patterned as on the surface 300a in order to form parts for anode and cathode land electrodes 32b, 34b (see FIG. 4) without positionally deviating from the patterns of land electrodes 32a, 34a on the surface 300a previously formed with the resist. Thereafter, unnecessary parts of the copper foil were chemically etched according to a known technique, so as to form predetermined wires and land electrode patterns. Processing of each 20.0 mm×20.0 mm area formed on the 220 mm×220 mm substrate area will now be explained.

Via holes (each having a diameter of 0.2 mm) were formed so that 46 anode land electrodes 32a and 46 cathode land electrodes 34a formed within the 20. 0 mm×20. 0 mm area in the surface 300a of FR4 substrate 300 formed with patterns of wires and land electrodes communicated with their corresponding positions of 46 anode land electrodes 32b and 46 cathode land electrodes 34b on the other substrate surface 300b. By electroless plating, nickel was plated by 3 µm on the inner walls of the via holes, the patterning face of the surface 300a, and the land electrode face of the surface 300b, and gold was plated thereon by 0.08 µm.

(3) Mounting of Solid Electrolytic Capacitor onto Substrate

Thus produced solid electrolytic capacitors 1 were arranged on the FR4 substrate 300 such that all the anode terminal parts 14a were overlaid on their corresponding anode land electrodes 32a on the surface 300a, and they were integrated with each other with a silver-based epoxy conductive adhesive coated beforehand on the cathode parts 34a. This processing was similarly applied to the other patterns formed within the area of 220.0 mm×220.0 mm.

Each anode terminal part 14a of thus mounted solid electrolytic capacitor 1 was welded to its corresponding part of anode land electrode 32a by a YAG laser spot welder manufactured by NEC, so as to be integrated therewith. This processing was similarly applied to all of the 46 anode terminal parts 14a formed within the area of 20.0 mm×20.0 mm. Thus, 46 solid electrolytic capacitors 1 were mounted on the substrate 300. In the following, the 46 solid electrolytic capacitors 1 mounted in this example will be referred to as solid electrolytic capacitors 1A in particular.

(4) From External Packaging/Processing to Evaluation

After the solid electrolytic capacitors 1A were secured onto the surface 300a of the FR4 substrate 300 and integrated therewith, the solid electrolytic capacitor mounting part of the FR4 substrate 300 was molded with an epoxy resin by vacuum printing such that the resin thickness on the surface 300a became 1.2 mm.

While the surface 300a of the molded FR4 substrate 300 was faced up, dicing was performed with reference to predetermined marking positions such that the patterned 20.0 mm×20.0 mm areas were severed from each other. After washing, 46 discrete type 20.0 mm× 20.0 mm solid electrolytic capacitor devices #1 shown in FIG. 7 were obtained. Thereafter, a predetermined voltage was applied to the solid electrolytic capacitor by a known method, so as to carry out aging, thereby fully lowering leakage currents, thus completing the product.

EXAMPLE 2

An FR4 substrate 300 for mounting a capacitor was prepared as in Example 1, and anode and cathode land electrode patterns were formed on both sides of the substrate as in Example 1.

The solid electrolytic capacitors 1A produced in Example 1 were arranged on the FR4 substrate 300 such that all the anode terminal parts 14a were overlaid on their corresponding anode land electrodes 32a on the surface 300a, and they were integrated with each other with a silver-based epoxy conductive adhesive coated beforehand on the cathode land electrodes 34b on the surface 300a of the substrate 300. This processing was similarly applied to the other patterns formed within the area of 220.0 mm×220.0 mm. Thus, 46 solid electrolytic capacitors 1 were mounted on the surface 300a. In the following, thus mounted 46 solid electrolytic capacitors 1 will be referred to as solid electrolytic capacitors 1B.

In this example, the remaining 46 solid electrolytic capacitors 1 (hereinafter referred to as solid electrolytic capacitors 1C) produced in Example 1 were laminated on the solid electrolytic capacitors 1B already secured to the substrate 300. Namely, the solid electrolytic capacitors 1C were arranged on the FR4 substrate 300 such that all the anode terminal parts 14a on the solid electrolytic capacitors 1C were overlaid on their corresponding anode land electrodes 32a on the surface 300a so as to attain such a lamination relationship with the anode terminal parts 14a of the solid electrolytic capacitors 1B as shown in FIG. 9, whereas the conductive layer part of the solid electrolytic capacitors 1B coated beforehand with a silver-based epoxy conductive adhesive was bonded to and integrated with the conductive layer part of the solid electrolytic capacitors 1C. This processing was similarly applied to the other patterns formed within the area of 220.0 mm×220.0 mm.

The anode terminal part 14a of thus mounted solid electrolytic capacitor 1B was welded to its corresponding part of anode land electrodes 32a by a YAG laser spot welder manufactured by NEC, so as to be integrated therewith. This processing was similarly applied to all of the 46 anode terminal parts 14a formed within the area of 20.0 mm×20.0 mm. Thus, the solid electrolytic capacitors 1B, 1C were mounted on the substrate 300.

Subsequently, as in Example 1, resin molding and a predetermined process were carried out in succession, whereby discrete type 20.0 mm×20.0 mm solid electrolytic capacitor devices #2 were obtained. Thereafter, a predetermined voltage was applied to the solid electrolytic capacitor by a known method, so as to carry out aging, thereby fully lowering leakage currents, thus completing the product.

Thus obtained solid electrolytic capacitor devices #1, #2 were soldered to a predetermined evaluation substrate, and their electrostatic capacities and $S_{21}$ characteristics were measured by using an impedance analyzer 4194A and a network analyzer 8753D which were manufactured by Agilent Technologies. According to thus obtained $S_{21}$ characteristics, equivalent circuit simulations were carried out, whereby electrostatic capacities and ESR and ESL values were determined.

As a result, characteristics of the solid electrolytic capacitors formed in solid electrolytic capacitor devices #1, #2 were obtained as shown in TABLE 1.

Table 1

TABLE 1

| | Electrostatic Capacity | ESR | ESL |
|---|---|---|---|
| #1 (1A) | 80.0 µF | 18 mΩ | 100 pH |
| #2 (1B + 1C) | 88.0 µF | 15 mΩ | 120 pH |

Without being restricted by the foregoing embodiments and examples, the present invention can be modified in various manners within the scope of the present invention defined in claims, and these modifications are included within the scope of the present invention as a matter of course.

The configurations of the above-mentioned examples can produce the effect of canceling out the respective magnetic fields caused by currents flowing through the anode lead electrode and cathode lead electrode adjacent each other, thereby being able to lower the ESL of the electrolytic capacitor.

What is claimed is:

1. A solid electrolytic capacitor comprising:
   a valve metal support having an opening partially surrounding a predetermined area;
   a dielectric layer formed on a surface of the valve metal support so as to expose a part of the predetermined area;
   a solid electrolyte layer formed on the dielectric layer;
   an insulating layer for electrically insulating the predetermined area in the valve metal support and the solid electrolyte layer from each other; and
   wherein the predetermined area forms a projection on the valve metal support, the projection protruding into the opening.

2. A solid electrolytic capacitor according to claim 1, wherein the solid electrolyte layers are formed on both surface sides of the valve metal support.

3. A solid electrolytic capacitor according to claim 2, comprising a plurality of the valve metal supports, the plurality of valve metal supports being laminated while the respective predetermined areas thereof are positioned with respect to each other.

4. A solid electrolytic capacitor according to claim 2, wherein the predetermined area in the valve metal support has a bent form.

5. A solid electrolytic capacitor according to claim 3, wherein the predetermined area in the valve metal support has a bent form.

6. A solid electrolytic capacitor according to claim 1, comprising a plurality of the valve metal supports, the plurality of valve metal supports being laminated while the respective predetermined areas thereof are positioned with respect to each other.

7. A solid electrolytic capacitor according to claim 6, wherein the predetermined area in the valve metal support has a bent form.

8. A solid electrolytic capacitor according to claim 1, wherein the predetermined area in the valve metal support has a bent form.

9. A solid electrolytic capacitor device comprising a solid electrolytic capacitor comprising a valve metal support having an opening formed about a predetermined area except for a part of surroundings thereof, a dielectric layer formed on a surface of the valve metal support so as to expose a part of the predetermined area, a solid electrolyte layer formed on the dielectric layer, and an insulating layer for electrically insulating the predetermined area in the valve metal support and the solid electrolyte layer from each other; and
    a substrate including an anode part electrically connected to the predetermined area in the valve metal support, and a cathode part electrically connected to the solid electrolyte layer.

10. A solid electrolytic capacitor device according to claim 9, wherein the anode part and cathode part penetrate through the substrate.

11. A solid electrolytic capacitor device according to claim 10, wherein a plurality of the predetermined areas are provided in the valve metal support;
    wherein the substrate is provided with a plurality of the anode parts corresponding to the respective predetermined areas in the valve metal support; and
    wherein the cathode part is disposed between anode parts placed close to each other in the plurality of anode parts.

* * * * *